United States Patent [19]
Cheng et al.

[11] Patent Number: 5,918,702
[45] Date of Patent: Jul. 6, 1999

[54] HIGH EFFICIENCY GREASE GUN WITH SEALED GREASE BARREL GREASE-SELF-ABSORPTION

[76] Inventors: Bao Cheng; Hu Cheng, both of No. 87, Chang Bai Street, Shenyang, China

[21] Appl. No.: 08/856,150

[22] Filed: May 14, 1997

[30] Foreign Application Priority Data

| Jun. 3, 1996 | [CN] | China | 96 1 15352 |
| Jan. 6, 1997 | [CN] | China | 97 1 05001 |

[51] Int. Cl.$^6$ ................................................. F16N 21/00
[52] U.S. Cl. ...................... 184/105.2; 222/256; 222/327
[58] Field of Search ....................... 184/28, 38.1, 105.2; 222/256, 257, 258, 259, 262, 326, 327

[56] References Cited

U.S. PATENT DOCUMENTS

| 1,941,140 | 12/1933 | Dodge | 184/105.2 |
| 2,923,443 | 2/1960 | Sundholm | 184/105.2 |
| 3,231,147 | 1/1966 | Leahy | 184/105.2 |
| 4,509,662 | 4/1985 | Weiss | 222/327 |
| 4,946,077 | 8/1990 | Olsen | 184/105.2 |
| 5,044,471 | 9/1991 | Machek | 184/105.2 |
| 5,105,912 | 4/1992 | Heister | 184/105.2 |
| 5,165,572 | 11/1992 | Bath | 222/327 |
| 5,582,331 | 12/1996 | Van Moerkerken | 222/327 |

FOREIGN PATENT DOCUMENTS

| 969604 | 9/1964 | United Kingdom | 222/262 |
| 1318022 | 5/1973 | United Kingdom | 184/105.2 |
| 2273745 | 6/1994 | United Kingdom | 184/105.2 |

*Primary Examiner*—Christopher Verdier
*Attorney, Agent, or Firm*—Smith, Gambrell & Russell, LLP; Beveridge, DeGrandi, Weilacher & Young Intellectual Property Group

[57] ABSTRACT

A grease gun device includes a cock body having a piston cylinder and a slot joint. The piston cylinder also includes a seal washer opening and an outlet opening spatially disposed from the seal washer opening. A piston is reciprocatingly engaged in the piston cylinder for moving grease from the slot joint to the outlet opening, wherein a valve mechanism selectively allows grease from the piston cylinder to pass through the outlet opening. A grease supply barrel having a grease opening is engaged with the cock body to supply grease to the piston cylinder, and a sealed piston closes the other end of the grease supply barrel. A jacket is mounted about the grease barrel and connected with the cock body, wherein the diameter of an outermost periphery of the grease barrel is less than an inside diameter of the jacket, such that the grease barrel does not overlap the jacket. A rear cover engages the far end of the jacket. In use, moving the piston in a first direction in the piston cylinder pushes grease through the outlet opening, and moving the piston in a second direction in the piston cylinder induces a vacuum pressure in the piston cylinder, which moves grease from the grease barrel, through the slot joint, and into the piston cylinder. A seal washer disposed in the seal washer opening sealingly engages the piston and helps maintain the vacuum pressure in the piston cylinder.

6 Claims, 2 Drawing Sheets

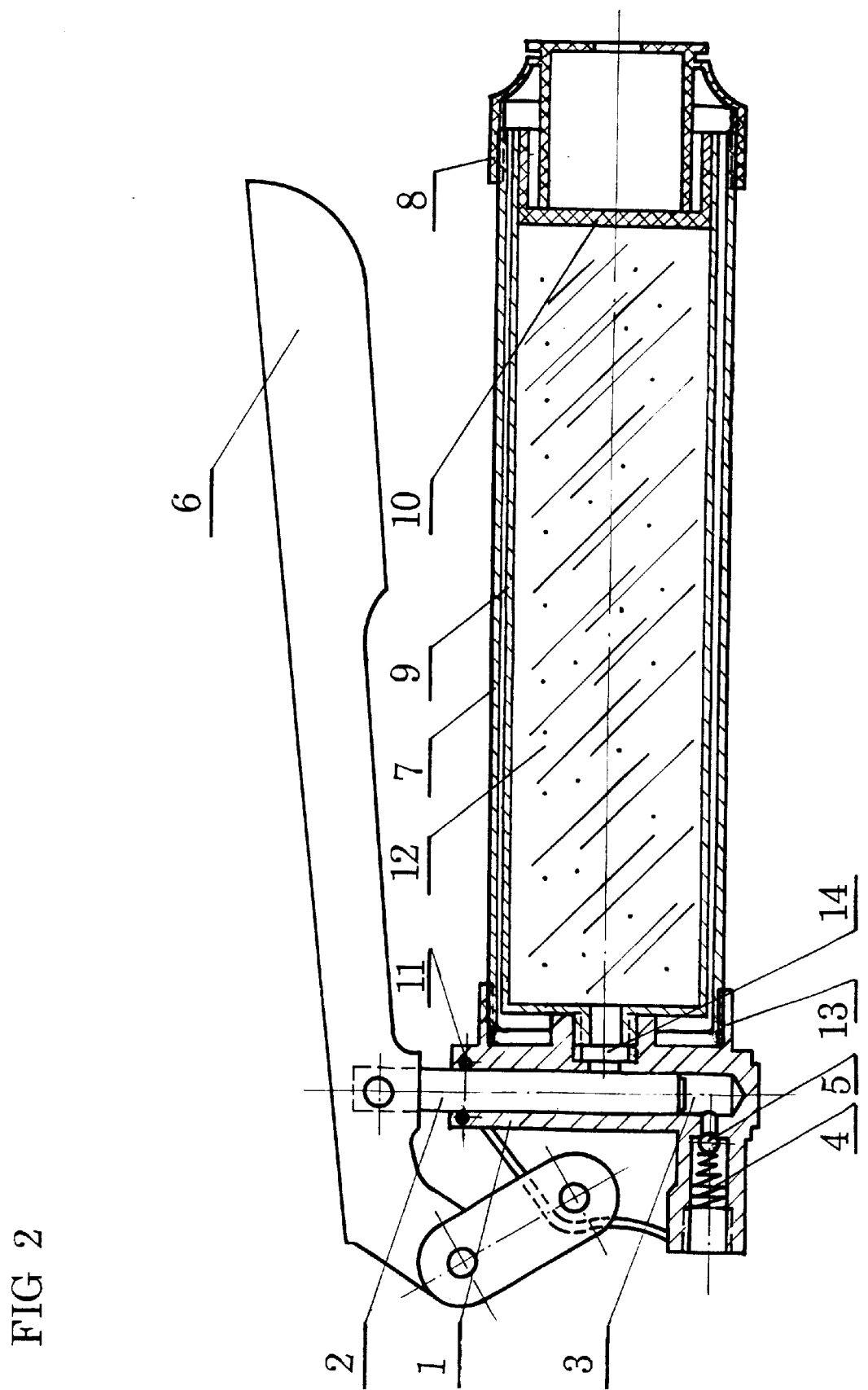

HIGH EFFICIENCY GREASE GUN WITH SEALED GREASE BARREL GREASE-SELF-ABSORPTION

BACKGROUND AND SUMMARY OF THE INVENTION

This invention relates to a new greasing device, and in particular, it relates to a device used for lubricating or greasing. The invention comprises a high efficiency grease gun that adopts a sealed grease barrel grease-self-absorption technique.

Greasing devices commonly are used to lubricate the frictional parts of machines with oil or grease. A simple grease gun device is mainly composed of a grease applying device and a grease storage device, for example, the typical grease gun device used to apply semi-solid grease. The grease applying device consists of a cock body, a greasing piston, a pressure rod, a unidirectional locking ball, and a pressure spring. When the pressure rod is pushed down, it drives the greasing piston to push the lubricating grease through the locking ball to the flow nipple, through which the grease is applied to the frictional parts of the machine. The unidirectional locking ball and the pressure spring are fixed inside the grease groove to form a one-way valve so that the grease is moved forward and not sent back to the cylinder.

The grease storage device is a grease storage barrel, in which a piston and a piston rod are located. An energy-storage spring is fixed on the external side of the piston, and when pressure is exerted on the piston surface, grease inside the grease barrel will be pushed into the cylinder of the grease applying device. When the pressure rod is lifted after one action of greasing is finished, a negative pressure is formed inside the cylinder, and the pressure of the energy-storage spring drives the grease inside the grease barrel quickly into the cylinder to prepare for a second greasing process when pressure is again exerted on the pressure rod.

However, it is very inconvenient to fill the above-mentioned grease gun with grease. After the grease-storage barrel is dismantled from the cock body, the piston pull rod is drawn to enable the grease barrel piston to return to the bottom of the grease barrel so that additional grease can be placed in the grease barrel. After the piston rod returns to the bottom of the grease barrel, the pull rod is fixed onto the rear cover by a safety groove on the rod. When the rod is pulled, the energy-storage pressure spring will exert a great pressure onto the piston. At this moment, the safety unit is likely to break away because of vibrations, and the piston may spring back abruptly, at which time grease in the grease barrel may be ejected out, resulting in wasted grease. Moreover, this kind of grease filling method is likely to result in impurities, such as sand or short fibers, being filled into the grease storage barrel, and these impurities might block up the grease nipple of the greasing device. Furthermore, the grease barrel piston tightness in this kind of structure is not very good, and grease may easily leak from the rod or piston wall. The leakage of grease is not only a waste, but it will pollute the task environment as well.

Although the above-described greasing device has its defects, it is still widely used today because its structure is simple and alternative products do not exist.

The aim of this invention is to design a new greasing device, and particularly a high efficiency grease gun. This tool overcomes the shortcomings of traditional products. Moreover, it is easy to fill this tool with grease. Grease barrel tightness is good so that grease leakage is effectively prevented; and therefore, this tool not only raises the grease utilization ratio, but it also makes the operation process clean.

In accomplishing the above aims, this invention greatly improves the structure of the traditional grease applying device. It not only retains the favorable characteristics of traditional greasing devices, such as having a simple structure and being flexible in operation, but it also changes the structure of the grease storage part from that of traditional products. The device according to the invention is easy to fill with grease, and the tightness of the grease storage barrel is good so that the grease utilization ratio and the grease filling quality are improved.

Specifically, the high efficiency grease gun in accordance with this invention consists of two parts: a grease applying device and a grease storage device. These parts have the characteristics described below.

The grease storage device consists of a sealed grease barrel and a jacket. The sealed grease barrel is a barrel-type device with an opening at one end. Inside the barrel is a sealed piston. The sealed grease barrel is mounted on a cock body of the greasing device piston. The opening of the sealed grease barrel leads to the grease slot of the cock body, and the grease barrel is sealed properly so that grease in the sea ed grease barrel can enter into the greasing cylinder through the barrel opening and the grease slot. A simple installation method includes mounting and fixing the sealed grease barrel on the cock body with the joint sealed using the screw threads on the barrel opening and on the grease slot of the cock body.

Another feature of the grease storage device according to this invention is that an energy-storage spring is not employed. However, because the grease gun is a frequently-used tool, in order to make its use convenient and to provide a prolonged life for the grease gun, a jacket is mounted on the external side of the sealed grease barrel, and the jacket is fixed on the cock body of the greasing device. Inside the jacket, an energy-storage spring is not used to push the sealed piston in the sealed grease barrel.

The greasing device is made up of a cock body, a grease filler plug, a cylinder, a pressure spring, a locking ball, and a seal washer. A slot is cut on the internal wall of the cylinder, and the seal washer is located on the slot. The sealed slot is located on the external cavity of the cylinder, and it improves the tightness between the cylinder wall and the greasing piston so that when the greasing piston operates, grease leakage between the cylinder wall and the greasing piston can be prevented. The seal washer can be made of oil resistant rubber and resin which has good oil resistance.

The principles of this invention are different from those of well-known greasing devices. Because there is no energy-storage spring in the jacket of the grease gun, grease in the sealed grease barrel is not pushed into the cylinder cavity by a spring force exerted on the sealed piston. Rather, grease is drawn into the cylinder cavity by the negative pressure inside the cylinder cavity. When the pressure rod is compressed and then lifted, the good tightness between the greasing piston and the cylinder wall caused by the seal washer makes it possible for a negative pressure to exist inside the cylinder cavity, and atmospheric pressure moves the sealed piston in the sealed grease barrel forward to draw grease from the grease barrel to fill in the cylinder cavity.

In conventional greasing devices, there is no sepal washer, and therefore, the tightness between the greasing piston and the cylinder wall is not good enough to form a sufficient negative pressure when the greasing piston moves outward. Accordingly, the pressure of the energy-storage spring has to be used to push grease into the cylinder cavity.

Moreover, in the device according to the invention, there is only a sealed grease barrel inside the grease gun, and there is no piston rod. Not only is the structure greatly simplified, but also the grease leakage problem, which is usually caused by bad tightness between the piston and rod, is solved. Grease filling is carried out without any elastic force, so it is very easy to fill the sealed grease barrel with grease, thus avoiding the undesirable event described above that often occurs when filling the grease storage barrel with grease. The device according to the invention is convenient to fill with grease, and the possibilities of mixing impurities in with the grease are greatly reduced. The sealed grease barrel, as used in this invention, can be made of plastics or sheet metal, and because of their low cost, disposable sealed grease barrels can be manufactured. Dedicated devices can be used to fill grease into the sealed grease barrel to effectively guarantee grease quality. In use, the cap of the sealed grease barrel is removed before use, the grease barrel is fixed on the cock body, and, in this manner, the grease filling process is conducted. Compared with traditional grease gun products, the grease gun according to the invention is flexible and convenient to use.

In order to further improve the above-mentioned device, the manufacturing engineering of the product has been improved, and the working accuracy of the cylinder and the greasing piston in the greasing device has been increased to ensure that the movable fit clearance between the cylinder and the greasing piston is less than 60 μm. This not only increases the tightness of the cylinder and the greasing piston, but it also effectively prevents grease from returning to the sealed grease barrel along the clearance between the cylinder and the greasing piston during the process of filling the cylinder with grease. Fit clearance between the cylinder and the greasing piston in traditional grease guns is comparatively large, and a considerable amount of grease returns to the grease barrel during the process of filling the cylinder with grease so that the operating efficiency of the greasing device is decreased. The greasing efficiency of this invention is increased more than 30% as compared with ordinary greasing devices.

BRIEF DESCRIPTION OF THE FIGURES

The following is a further description of this invention, and some figures are attached, however, it should be understood that the technology of this invention is not restricted only to the examples represented by the attached figures.

FIG. 2 is another sectional drawing of a grease gun structure according to this invention.

DETAILED DESCRIPTION OF THE FIGURES

Figure 1:
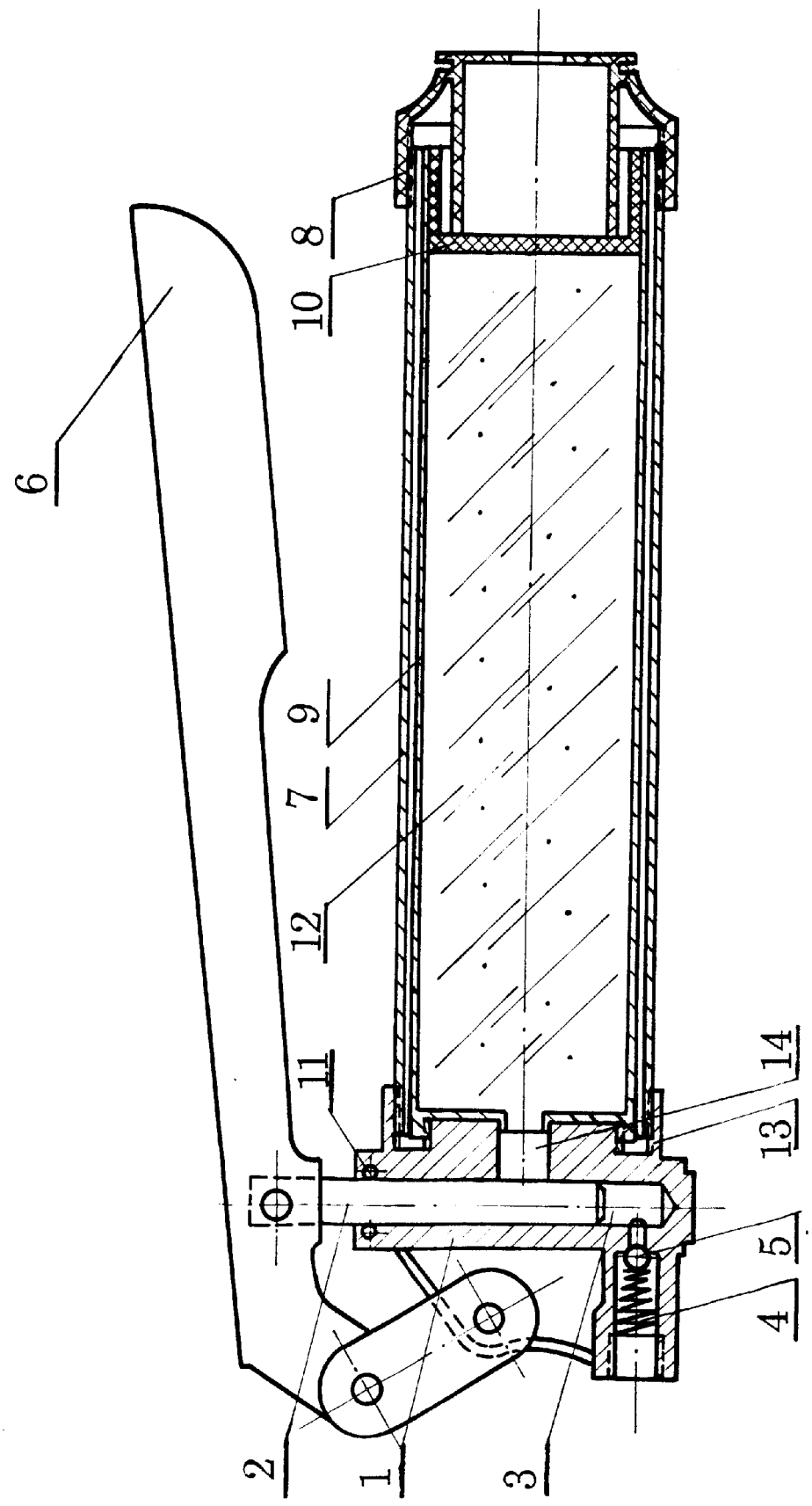
FIG. 1 shows a partial sectional drawing of a high efficiency grease gun structure according to this invention.

In the figures, the corresponding illustrated parts are as follows: 1. cock body; 2. greasing piston; 3. cylinder; 4. pressure spring; 5. locking ball; 6. pressure rod; 7. jacket tube; 8. rear cover; 9. sealed grease barrel; 10. sealed piston; 11. seal washer; 12. grease; 13. greasing slot joint of the cock body; and 14. base of the cock body.

The structure shown in FIG. 1 is an example of this invention. The greasing device consists of a cock body (1), greasing piston (2), a locking ball (5), a pressure spring (4), and a pressure rod (6). A slot is cut on the external side of the cylinder (3), and a seal washer 11 is located inside the slot, which ensures good tightness between the cylinder wall and the greasing piston (2). In order to increase performance, the movable fit clearance between the greasing piston (2) and the cylinder (3) wall is less than 60 μm.

A grease-storage device is a sealed grease barrel (9) in which grease (12) is filled. The opening of the sealed grease barrel (9) is threadingly mounted to the greasing slot joint of the cock body (13). At the other end of the sealed grease barrel (9) exists another opening. The sealed piston (10) is located inside the grease barrel (9), and in this manner, grease barrel tightness is ensured. The front end of jacket (7) is fixed with a threaded connection on the base of the cock body (14), and its rear end is mounted on the rear cover (8).

When the above grease gun is utilized, the opening of the sealed grease barrel (which includes grease (12)) is mounted on the greasing slot joint (13) of the cock body (1). Then, the jacket tube (7) is fastened, and the pressure rod (6) is pressed repeatedly several times. At this moment, grease (12) is drawn to fill the cavity of the cylinder (3), and the greasing operation can be conducted.

FIG. 2 shows another example of the invention, and most of its structure is the same as that shown in FIG. 1. The only difference is that the opening of the sealed grease barrel (9) is of an external and convex orientation, while that of the sealed grease barrel (9) in FIG. 1 is of an internal and concave orientation. This structure variation is designed to accommodate different kinds of openings of grease barrels. The operational procedures are as discussed above in regard to FIG. 1, and its components can be manufactured with conventional equipment.

Because of the good tightness between the greasing piston and the sealed grease barrel, the grease gun according to this invention does not leak grease after a long period of use. The grease in the grease barrel can be almost completely utilized. Compared with conventional grease guns, the grease utilization ratio of this grease gun can be increased by 30%. It is particularly convenient when a disposable sealed grease barrel is used, and the greasing proficiency can be considerably increased. Furthermore, the grease gun can be used to inject lubricating grease as well as lubricating oil (machine oil), therefore, its application is wider than that of traditional grease guns.

We claim:
1. A grease gun, comprising:
   a cock body having a piston cylinder and a slot joint defined therein, said piston cylinder further defining a seal washer opening and an outlet opening spatially disposed from said seal washer opening, said slot joint being located so as to admit grease into said piston cylinder;
   a piston reciprocatingly engaged in said piston cylinder for moving grease from said slot joint to said outlet opening;
   a seal washer disposed in said seal washer opening and being in sealing contact with said piston;
   a grease barrel having a grease opening at a first end thereof, said grease barrel being threadingly engaged with said cock body such that said grease opening is in communication with said slot joint of said cock body;
   a sealed piston disposed at a second end of said grease barrel located opposite to the first end;
   a jacket mounted about said grease barrel and connected with said cock body, wherein a diameter of an outermost periphery of the first end of the grease barrel is less than an inside diameter of a first end of the jacket, such that the first end of the grease barrel does not overlap the first end of the jacket;

a rear cover threadingly engaged with a second end of said jacket located opposite to the first end; and a valve mechanism mounted with respect to said outlet opening so as to selectively allow grease from said piston cylinder to pass through said outlet opening, wherein moving the piston in a first direction in the piston cylinder pushes grease through the outlet opening, and moving the piston in a second direction in the piston cylinder induces a vacuum pressure in the piston cylinder, which moves grease from the grease barrel, through the slot joint, and into the piston cylinder.

2. The grease gun defined by claim 1, wherein: said grease opening of said grease barrel is a concave opening.

3. The grease gun defined by claim 1, wherein: said grease opening of said grease barrel is a convex opening.

4. The grease gun defined by claim 1, wherein: said grease barrel and said sealed piston are formed from a plastic material.

5. The grease gun defined by claim 1, wherein: said grease barrel and said sealed piston are formed from sheet metal.

6. The grease gun defined by claim 1, wherein: said grease barrel is a sealed disposable grease barrel.

* * * * *